(12) United States Patent
Luo

(10) Patent No.: US 6,376,764 B1
(45) Date of Patent: Apr. 23, 2002

(54) SOLAR CELL BATTERY REPLACEMENT UNIT

(76) Inventor: Ching-Hsing Luo, National Cheng Kung University, Tainan (TW), 70101

( * ) Notice: Subject to any disclaimer, the term of this patent is extended or adjusted under 35 U.S.C. 154(b) by 0 days.

(21) Appl. No.: 09/754,199

(22) Filed: Jan. 5, 2001

(51) Int. Cl.[7] .............................................. H01L 25/00
(52) U.S. Cl. ...................... 136/244; 136/291; 136/293; 136/245; 307/64; 307/150; 307/151; 320/101; 323/906; 323/221
(58) Field of Search ................................ 136/244, 291, 136/293, 245; 307/64, 150, 151; 320/101; 323/906, 221

(56) References Cited

U.S. PATENT DOCUMENTS 5,605,769 A * 2/1997 Toms .............................. 429/9
6,114,830 A * 9/2000 Luo ............................ 320/101

FOREIGN PATENT DOCUMENTS

GB 2208254 A * 3/1989
JP 64-659 A * 1/1989

* cited by examiner

Primary Examiner—Alan Diamond

(57) ABSTRACT

A solar panel is operably connected to a power capacitor and associated circuitry which includes at least one diode for ensuring correct current flow direction. The power capacitor is inside a cartridge which is has exterior electrical contacts and overall dimensions enabling it to fit into the space intended for and replace at least one conventional battery. The exterior contacts, in conjunction with the power capacitor and associated electrical circuitry, enable provision of direct current (DC) electrical power of appropriate voltage and amperage to various electronic devices: cellular telephones, personal digital assistants (PDAs), compact disc (CD) and digital video disc (DVD) players, infrared and radio remote controllers, and other low power consumption devices including radios, alarms and calculators, etc.

1 Claim, 4 Drawing Sheets

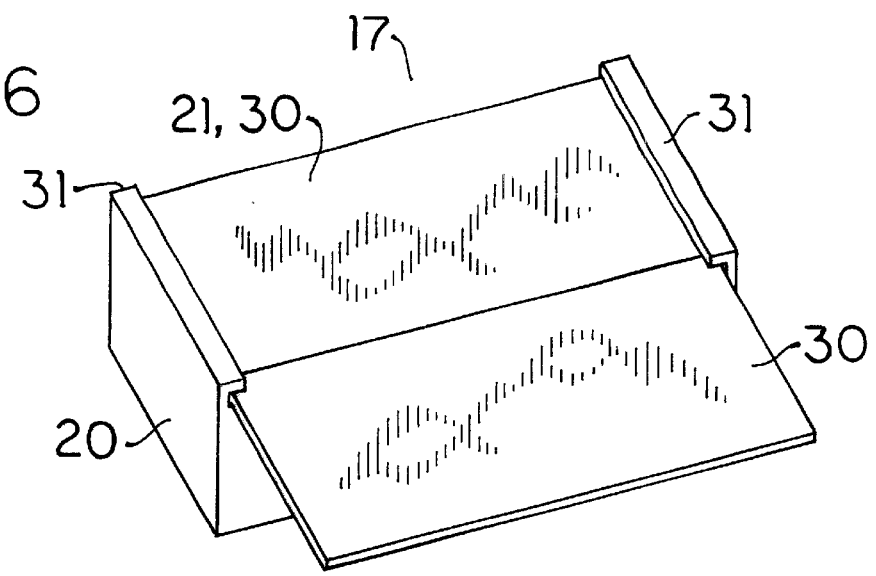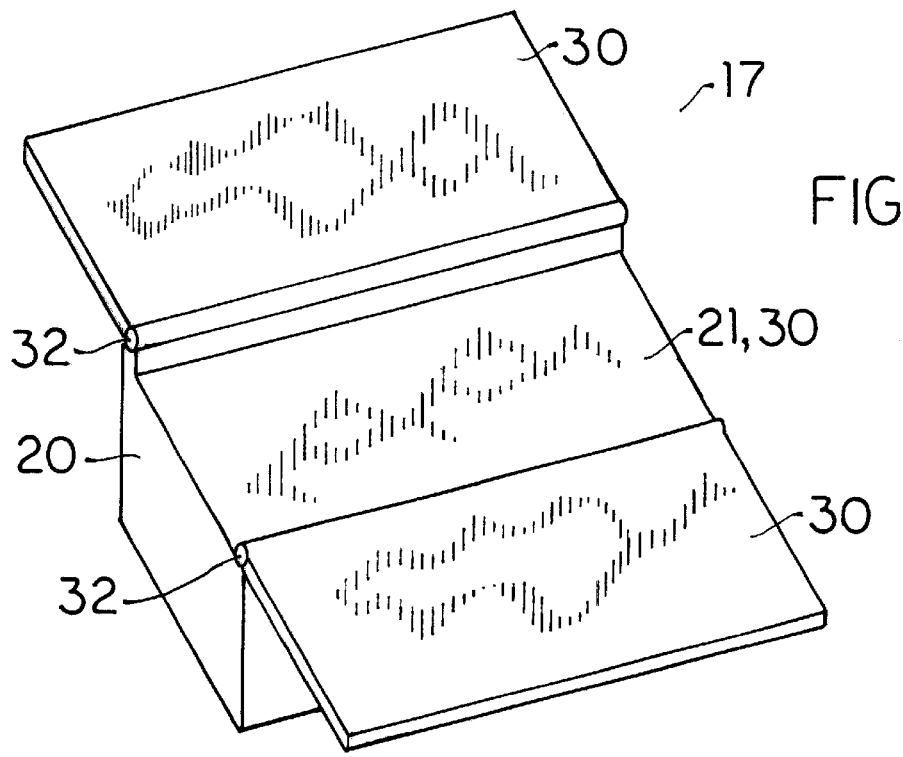

SOLAR CELL BATTERY REPLACEMENT UNIT

BACKGROUND OF THE INVENTION

1. Field of the Invention

The field of the present invention relates: generally to substitute electrical energy power packs; more particularly to substitute electrical power packs utilizing a solar energy source; and most specifically to substitute electrical power packs utilizing a solar energy source in replacement of conventional batteries as the energy source in electronic devices.

2. General Background

A wide range of electronic devices are typically powered by conventional batteries, i.e. 'dry cells' inclusive of disposable and rechargeable types, which are considered to be expensive in both economic and environmental terms as disposal, replacement, and the energy content required of manufacture and recharging is inevitable.

It is considered that avoidance of the expense in economic and environmental terms in disposal, replacement, and the energy content required of manufacture and/or recharging is desirable.

References Cited

| Patent # | Inventor | Date | Title |
| --- | --- | --- | --- |
| DT 2 732 417 | Krause | Feb 1979 | Power Supply For Electronic Apparatuses |
| US 4,434,395 | Higuchi | Feb 1984 | Solar Cell Power Supply Circuit |
| US 4,634,953 | Shoji et al. | Jan 1987 | Electronic Equipment With Solar Cell |
| US 5,793,184 | O'Connor | Aug 1998 | Solar Power Supply Unit For Battery Operated Devices |
| US 5,898,932 | Zurlo et al. | Apr 1999 | Portable Cellular Phone With Integral Solar Panel |
| Ching-Hsing Luo | Solar Cell Battery Replacement Unit | | January 5, 2001 |

Discussion of the References Cited

Krause discloses a "power supply" "chiefly intended for . . . pocket calculators, measuring instruments, and clocks" (English Abstract) utilizing photovoltaic cells, "normally arranged in two banks of opposite polarity" connected to the first of two capacitors through a first switch, the connection between the two capacitors being through a "voltage sensitive switch" which closes after the first capacitor has attained a 'set', i.e. predetermined, voltage level. Similarly, when the second capacitor has attained a set voltage level a third switch connects the same to load. Use of two capacitors is considered to provide increased speed in obtaining sufficient charge for operation.

Higuchi discloses a 'solar cell power supply circuit' which utilizes a capacitor as a "back up", i.e. reserve, to the photovoltaic cell(s) which supply of power to a large scale integrated circuit (LSI) such as found in a calculator. A voltage sensitive switch for the solar supply connects the capacitor to the load when required preferably with an associated alarm indicating this condition.

Shoji et al. disclose use of a voltage converter between a capacitor and load and, preferably, between the solar cell supply and the capacitor in which case the conversion is to a "predetermined voltage" while in the first it is to "a (first) voltage which is lower than the charged voltage of the capacitor and higher than a minimum operating voltage of the load" (Abstract). A "quick start means" (claim 1) divides solar cell output between the capacitor and the voltage converter between the capacitor and the load when the capacitance is below the first voltage.

O'Connor discloses use of a solar cell array connected to a "DC-DC converter" (Abstract), or voltage multiplier (Claim 1) for the supply of power to a rechargeable cell or cells at an appropriate voltage level which is considerably higher than that output by the solar cell array.

Zurlo discloses a 'portable cellular phone with integral solar panel' "coupled to the rear face" and "adapted to convert ambient light into electric power" (Abstract) which is supplied to at least one rechargeable battery which powers the phone. A recharging base with AC input is required and reverse current flow from the batteries, or recharging base, to the solar panel is "precluded" by "an array of diodes" (Claim 1).

Statement of Need

While the use of solar power supplied to a capacitor for powering a calculator or similar integrated circuit (IC) is known, and the use of solar power for recharging batteries in a electronic apparatus is also known in the prior art, there is no disclosure of a solar cell unit utilizing capacitance for storage which would operate in substitution or replacement of batteries. The prior art is cognizant of electronic apparatus with a solar cell and capacitance circuit connected to a particular IC load or use of solar cells as an auxiliary for recharging batteries but not as a unit generating electricity from photovoltaic cells and stored for discharge through the contacts intended for batteries which is necessary for replacement of conventional batteries by photovoltaic generation of electricity and for which a poignant need is hence discerned.

SUMMARY OF THE INVENTION

Objects of the Invention

The encompassing object of the present invention is the provision of a substitute electrical power source for conventional, disposable and rechargeable, batteries, in electronic devices.

The primary auxiliary object of the present invention is the provision of a substitute electrical power source for conventional batteries which is practically inexhaustible.

The primary ancillary object of the present invention is the provision of a substitute electrical power source for conventional batteries which utilizes solar energy.

A secondary auxiliary objective of the present invention is the provision of a substitute electrical power source for conventional batteries which is less expensive economically than the utilization of conventional batteries inclusive of both disposable and rechargeable types.

A secondary ancillary object of the present invention is the provision of a substitute electrical power source for conventional batteries which does not require the repeated purchase of disposable batteries for operation of an electronic device over an extended period.

Another secondary ancillary object of the present invention is the provision of a substitute electrical power source for conventional batteries which requires neither the utilization of standard electrical power nor transformation of alternating to direct current for recharging rechargeable batteries for operation of an electronic device over an extended period.

Another secondary auxiliary objective of the present invention is the provision of a substitute electrical power source for conventional batteries which is environmentally benign in comparison with conventional batteries.

Other secondary ancillary objects of the present invention include the provision of a substitute electrical power source for conventional batteries which relies upon neither the repeated disposal of disposable batteries nor the utilization of standard electrical power for recharging rechargeable batteries for operation of an electronic device over an extended period.

Principles Relating to the Present Invention

In achievement of the above stated objectives it is considered that a solar panel be utilized to supply electrical current to a relatively large capacitor utilized to power an electronic device through electrical contacts possessed by said electronic device intended for transmitting current from at least one conventional battery. As these electrical contacts are invariably located inside a cavity intended to hold at least one battery a cartridge is suggested which contains the capacitor and other associated circuitry, dimensioned to fit inside this battery cavity, which possesses exterior electrical contacts dimensioned to make contact with the electrical contacts possessed by said electronic device, i.e. possessing a linear dimension therebetween substantially equivalent to the linear dimension between the contacts of the conventional battery or batteries replaced thereby.

It is further considered that the cartridge has one exposed exterior surface when fitted into the battery cavity and that this exposed surface may be utilized for the disposition of the solar panel. This exposed cartridge surface, however, is only substantially equivalent in area to the battery cavity cover invariably provided with an electronic device intended to operate upon the electricity supplied by at least one battery located in a battery cavity, hereinafter known simply as an electronic device, and this area may be less than the area desired for a solar panel of wholly satisfactory capacity to supply the electrical power required by anticipated operation of many such electronic devices particularly if the solar panel is not expected to be exposed to direct sunlight for periods sufficient to fully charge the power capacitor. It is accordingly suggested that the solar panel be either: (a) of one piece separate from the cartridge; or (b) comprised of multiple sections; or (c) adjacently extensible from the exposed cartridge surface; or (d) separable from the cartridge and expansible.

If the solar panel is separate from the cartridge it is further considered that the original battery cavity cover may be utilized in conjunction with a cartridge that is dimensioned to fit wholly within the battery cavity but that an aperture therethrough must be effected. It is further considered that the original battery cavity cover is invariable made of thermoplastic and an aperture therethrough of appropriate dimension for the necessary wiring may easily and neatly be effected with the end of a heated metal rod such as that readily obtainable from a section of a wire coat hanger. Alternatively, a cover similar to the original but with an aperture therethrough may be provided or the cartridge may be dimensioned to fit inside the interior of the battery case and occupy the space which the original cover occupied in which case the exposed exterior cartridge surface may resemble the original cover if desired.

In the general case that the solar panel possesses multiple sections the exposed exterior surface of the cartridge fitted into the battery cavity may comprise such a section and other sections may extend laterally adjacent to said exposed surface. These extensible sections my be:

i. hinged along an edge slightly elevated with respect to and common to the exposed surface of the cartridge;

ii. slidable as panels from a slightly elevated in disposition substantially parallel to said exposed surface;

iii. pivoted in a disposition above and substantially parallel to said exposed surface at a corner common to the same.

And it is also considered that the exposed surface of the cartridge may or may not comprise a solar panel section.

Alternatively to extension of multiple sections of solar panel from the exposed surface of the cartridge fitted into the battery cavity multiple sections may be utilized which are wholly separate or separable from said exposed surface and cartridge though connected to the same by the necessary wiring. These multiple sections may further be independently separable from each other or, in a manner outlined above in options i.–iii., preferably connected to each other in a manner enabling extension of each section adjacently with respect to each other simply to keep the solar panel together rather than having multiple pieces. This also orients the solar panels so connected and extended in a substantially planar disposition which is considered most effective for optimal light gathering and energy conversion in the generation of the electricity required of the power capacitor with other orientations considered feasible if generally unadvantageous. It is also considered that if the solar panel is wholly separate from, rather than separable from, the cartridge fitted into the battery cavity then it may possess any surface area desired for collection of light.

It is emphasized that the purpose of the solar panel is to provide sufficient electricity to the power capacitor in order for the cartridge to supply sufficient power for normal operation of the electronic device when fitted into the battery cavity in replacement of the batteries. Details concerning the power usage of a typical electronic device and the characteristics of the solar panel, suggested collection surface area, and power capacitor may be found below in discussion of the preferred embodiment which detailed discussion is also inclusive of the associated circuitry which directs the electricity generated by the solar panel to the power capacitor and delivers current of appropriate amperage at a voltage appropriate to a typical electronic device.

Other details concerning what is considered to be the best manner of making and using a preferred embodiment in accordance with the principles relating to the present invention are encompassed in the detailed discussion below wherein further benefits and advantages provided by the present invention may be further appreciated especially if read with reference to the drawings attached hereto and briefly described immediately below.

BRIEF DESCRIPTION OF THE DRAWINGS

FIG. 6 is an isometric view of a preferred embodiment of the principles relating to the present invention including a solar panel comprised of two sections of which one is located upon the exposed surface of the cartridge and the other is slideably extensible therefrom.

FIG. 7 is an isometric view of a preferred embodiment of the principles relating to the present invention including a solar panel comprised of three sections of which one is located upon the exposed surface of the cartridge and the other two are extensibly hinged laterally therefrom.

Figure 1:
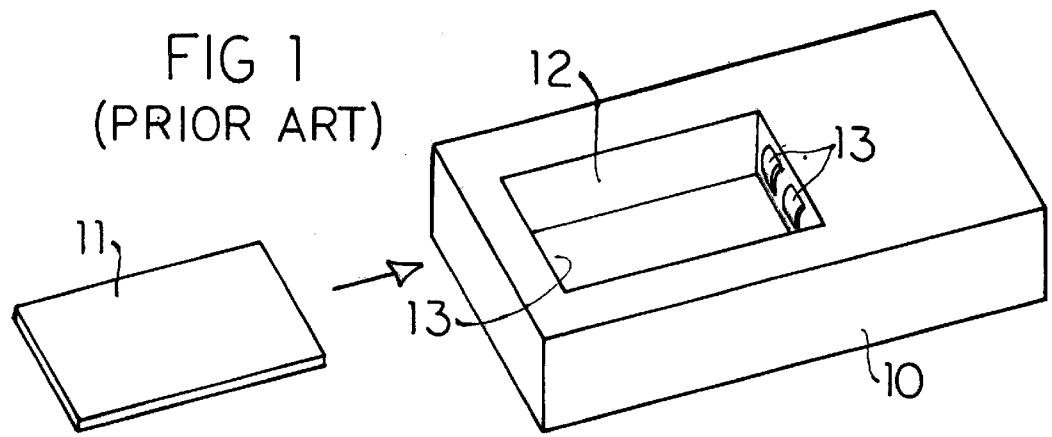
FIG. 1 (PRIOR ART) is an isometric view of the underside of a electronic device with the cover to the battery cavity removed and in which the electrical contacts are visible.

NOMENCLATURE 10 electronic device
11 battery cavity cover
12 battery cavity
13 electrical contacts
15 aperture in battery cavity cover
16 external wiring
17 solar panel
19 power capacitor
20 cartridge
21 exposed surface
22 dimensions
23 congruent electrical contacts
25 indicator
26 internal wiring
27 diode
29 switch
30 solar panel section
31 track
32 hinge
33 pivot
35 socket
36 plug
37 voltage regulator
39 flange

DETAILED DESCRIPTION OF THE PREFERRED EMBODIMENT

Figure 2:
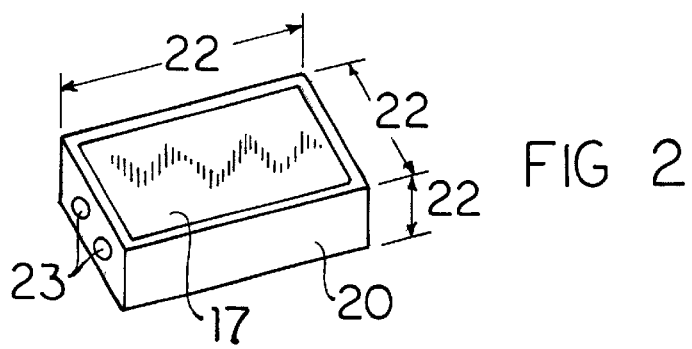
FIG. 2 is an isometric view of the underside of a cartridge in accordance with the principles relating to the present invention dimensioned to fit into the battery cavity of FIG. 1 in which congruent electrical contacts are visible.

The underside of a typical electronic device 10 is seen in FIG. 1 (PRIOR ART) with the cover 11 to the battery cavity 12 removed wherein two of the four electrical contacts 13 are seen, the other two electrical contacts 13 being disposed as indicated in direct opposition to the two electrical contacts 13 shown. It is noted that the battery cavity 12 possesses a rectilinear shape with a length between the opposed electrical contacts 13, a width, and a depth which are all substantially uniform. FIG. 2 depicts a cartridge 20 in accordance with the principles relating to the present invention possessing dimensions 22 approximating the length, width, and depth of the battery cavity 12 depicted in FIG. 1 and further possessing four congruent electrical contacts 23, two of which are clearly seen, the other two being disposed as indicated upon the opposite end of the cartridge 20 at a distance substantially equivalent to the distance between the electrical contacts 13 possessed of the electronic device 10 inside the battery cavity 12 as seen in FIG. 1.

Figure 3:
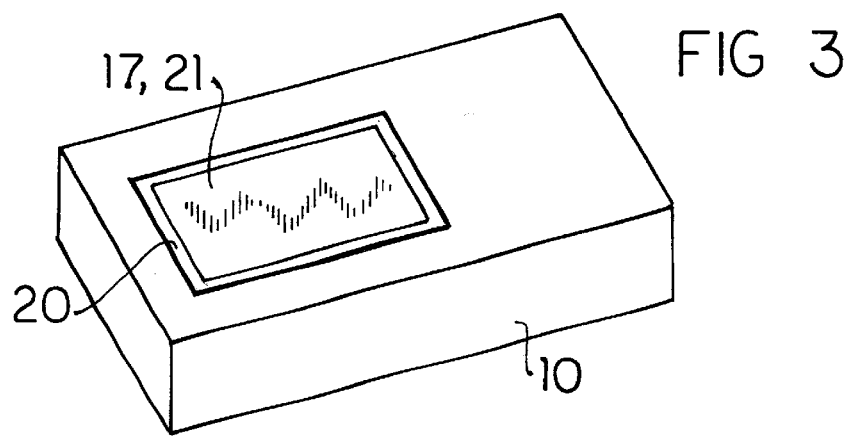
FIG. 3 is an isometric view of the underside of an electronic device with the cover to the battery cavity removed and replaced by the exposed surface solar panel of the cartridge of FIG. 2 fitted into the battery cavity.
Figure 4:
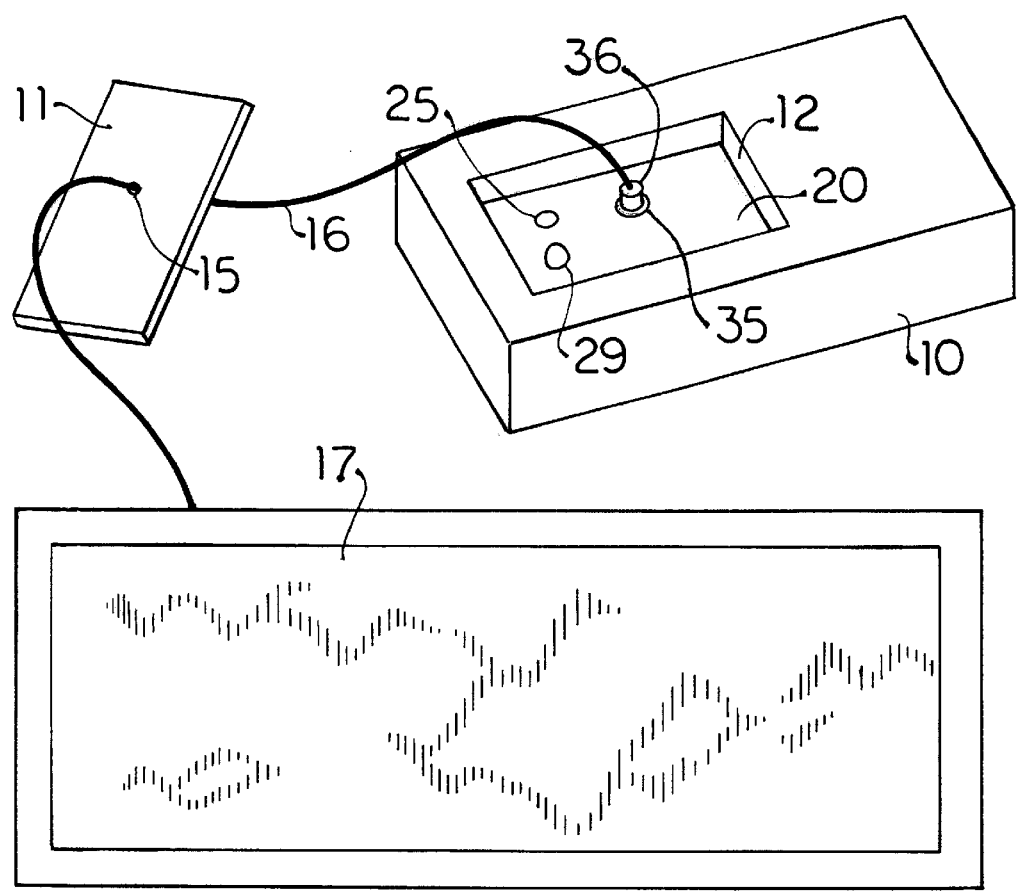
FIG. 4 is an isometric view of the underside of an electronic device with the cover to the battery cavity removed and possessing an aperture through which wires connecting a solar panel separate from the cartridge fitted into the battery cavity are seen.

FIG. 3 depicts the cartridge of FIG. 2 fitted into the battery cavity 12 of the electronic device 10 of FIG. 1 wherein it is further noticed that the exposed surface 21 of the cartridge 20 so disposed bears a solar panel 17 which is hence readily exposed to ambient light. The solar panel 17 absorbs light and converts the same to direct current (D.C.) electricity which is fed to a power capacitor 19 as depicted schematically in FIG. 5 which in turn supplies the electronic device through the congruent electrical contacts 23 in contact with the electrical contacts 13 of the electronic device 10 when the cartridge 20 is fitted into the battery cavity 12. A switch 29 is also seen in FIG. 4 protruding from the cartridge 20 fitted into the battery cavity 12 of the electronic device 10 adjacent an indicator 25 both of which are unnecessary to fulfillment of the principles relating to the present invention but which are suggested in a preferred embodiment of the same principles. The switch 29 can be of two different types: power or test circuit; as discussed further below.

The cartridge 20 seen fitted into the battery cavity 12 of a typical electronic device 10 in FIG. 4 is dimensioned to fit wholly inside so that the original cover 11 to the battery cavity 12 may be utilized in the manner intended and there is no exposed surface 21 of the cartridge 20. The original cover 11 requires an aperture 15 therethrough to permit passage of external wiring 16 from the enclosed cartridge 20 to the separate solar panel 17 as seen therein. As mentioned earlier, the cover 11 to the battery cavity 12 of an electronic device 10 is invariably molded in thermoplastic and an appropriately sized and shaped aperture 15 therethrough is readily obtained by pushing a heated end of a length of metal rod, such as that obtained from a section of an ordinary coat hanger, through the plastic cover 11. Alternatively, a new battery cavity cover 11 with an aperture of appropriate size, shape, and location for the passage of the external wiring 16 may be provided.

Neither cover 11, original or replacement, is necessary to an embodiment in accordance with the principles relating to the present invention. The purpose of utilizing either the original or a replacement battery cavity cover 11 is partly aesthetic in retaining as closely as possible the original appearance of the electronic device 10 and the cartridge 20 may simply possess an exposed surface 21 when fitted into the battery cavity 12 which imitates the appearance of the original cover 11 if desired. It is considered that a primary purpose of the cover 11 is to prevent the batteries, not shown, from being accidentally dislodged from the battery cavity 12 and a primary purpose of using either the original or a replacement cover 11 is to keep the cartridge 20 in place with the congruent electrical contacts 23 in operational contact with the electrical contacts 13 inside the battery cavity 12.

It is further considered that while many electronic devices 10 may use an identical configuration of batteries, e.g. two 'AA' in parallel as intimated by the shape of the battery cavity 12 depicted in FIG. 1, the covers 11 for one manufacture or model rarely fit another manufacture or even another model of the same manufacture. And keeping the cartridge 20 in place is a genuine concern, particularly since it is desirable to provide a cartridge 20 which possesses dimensions 22 substantially equivalent to the batteries replaced rather than that of a particular battery cavity 12 in order to obtain maximum versatility with regard to utilization within various electronic devices 10. Since the battery cavity covers 11 are considered to vary in configuration more widely than the configuration of the battery cavity 12 the provision of replacement covers 11 with an appropriate aperture 15 therethrough is considered to be problematic and use of the original battery cavity cover 11 is recommended as being the most practical and least expensive solution to the problem of keeping the cartridge 20 in proper disposition.

The embodiment of the principles relating to the present invention depicted in FIG. 4 hence preferably utilizes the original cover 11 to the battery cavity 12 which came with the electronic device 10. The solar panel 17 seen in FIG. 4 is also, as depicted therein, of one piece and separate from the cartridge 20 though connected by external wiring 16. One piece construction of the solar panel 17 is considered the most economic and separation from the cartridge 20 and the cover 11, while requiring external wiring 16 and hence an aperture 15 through the cover 11, readily enables optimization of the solar collection area presented by the solar panel 17 which is essentially one face of the same. Therefore, while the use of external wiring 16 and the practical necessity of effecting an aperture 15 through the battery cavity cover 11 is recognized as rather awkward in comparison with the preferred embodiments of the principles relating to the present invention depicted in FIGS. 2, 3 & 6–8, the embodiment of said principles depicted in FIG. 4 is considered the most practical.

Another benefit to utilization of the original battery cavity cover 11 in the manner depicted in FIG. 4 is found in the observation that not only do these covers 11 from different manufacturers vary in configuration for a battery cavity 12 intended to hold the identical configuration of batteries but these covers 11 also vary in the precise means of attachment to the electronic device 10 concerned. The battery cavity cover 11 depicted in FIG. 4 is similar to that depicted in FIG. 1 in being simply fitted on top of the battery cavity 12. Detents or catches typically located upon the cover 11 in combination with a recessed peripheral lip to the opening of the battery cavity 12 are typically utilized. None of these features are shown in the figures attached hereto; these and other forms of attachment are considered details which are well known in the prior art.

A typical cover 11 moreover, is slid into engagement in a substantially parallel direction with the back face of the electronic device 10 from just below the bottom of the same. This permits the use of at least one forward retention member to be automatically engaged with the engagement of at least one rearward catch. Other types of covers 11 are engaged with a perpendicular movement of the cover 11 relative to the back face of the electronic device 10 as implied in FIG. 1 and some, though this is admittedly quaint, use a threaded member, i.e. a bolt or screw, to attach the cover 11. Appropriate location of the aperture 15 through the cover 11 depends partly upon the motion required in fastening the same. The aperture 15 depicted in FIG. 4 is simply aligned with the plug 36 and socket 35 connection shown therein which assumes a generally perpendicular displacement of the cover 11 with respect to the plug 36. If the cover 11 slides in a substantially parallel displacement with the electronic device 10 in removal and fastening of the same then it is suggested that the aperture 15 be through the bottom end of the cover 11 because this location aligns the external wiring 16 with the direction of motion required and hence facilitates fastening of the cover 11 with the external wiring 16 connected.

Utilization of the original cover 11 and appropriate location of the aperture 15 therethrough, in accordance with the motion required in fastening, enables use of external wiring 16 which is fixedly connected to the cartridge 20, in the manner depicted in FIG. 4 in connection to the solar panel 17, rather than removably attached with the use of a plug 36 inserted into a socket 35 as shown therein. A socket 35 and plug 36, which mate to provide an operable electrical connection for the transmission of electrical current from the solar panel 17 through the external wiring 16 to the cartridge 20, could also be used in removable connection of the external wiring 16 to the solar panel 17 if desired. It is considered that it is desirable to utilize the electronic device 10 in as nearly the original configuration as possible, without wiring extending from the same, that the solar panel 17 is only used for recharging the power capacitor 19 inside the cartridge, and therefore it is more desirable to have a removable connection of the external wiring 16 to the cartridge 20 than to have a removable connection of the external wiring 16 to the solar panel 17. The arrangement depicted in FIG. 4 is hence considered the preferred case in this regard.

The use of a solar panel 17 wholly separate or separable from the cartridge 20 is not strictly necessary however, as shown in FIGS. 3 & 7 and discussed further below, and hence the external wiring 16 between these two components 17, 20 is not necessary to fulfillment of the principles relating to the present invention. It is only necessary that the solar panel 17 be electrically connected to the power capacitor 20 in a manner enabling charging of the latter which must be capable of providing current of appropriate voltage and amperage to the congruent contacts 23 which must have the capability of being brought into electrical contact with the electrical contacts 13 of the electronic device 10. The electrical contacts 13 shown in FIG. 1, moreover, need not necessarily be of the exposed resilient type depicted which is considered to be typical for use with ordinary, disposable, dry cell batteries such as the 'AA' type mentioned earlier. Many electronic devices 10 are intended to operate with a battery pack which possesses external wiring 16 and a plug 36, typically, which is inserted into a socket 35 found as an ancillary cavity within the battery cavity 12. Portable telephones, for example, are commonly manufactured in this manner and other electronic devices 10 which are intended to be powered by rechargeable batteries commonly utilize this type of connection.

Figure 5:
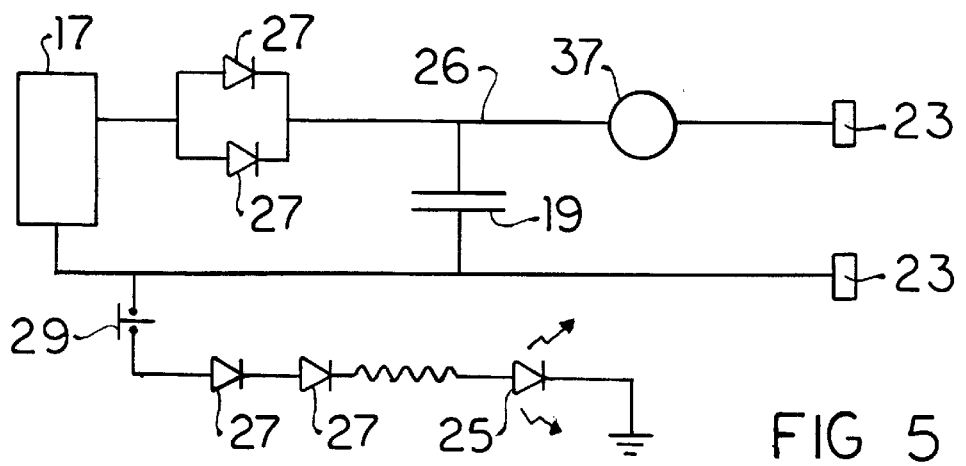
FIG. 5 is a schematic view of a preferred embodiment in accordance with the principles relating to the present invention.

Regardless of the mechanical connectors utilized the electrical connections necessary between the components necessary to fulfillment of the principles relating to the present invention are represented schematically in FIG. 5 which also depicts a test circuit, connected to the main circuit including the power capacitor 19, which is optional but part of a preferred embodiment of said principles. As seen in FIG. 5 the solar panel 17 is electrically connected by internal wiring 26, and may further be connected by external wiring 16 as discussed above, in parallel to a power capacitor 19 which is further connected, in parallel, to the congruent electrical contacts 23. It is necessary that at least one diode 27 be located along wiring 16, 26 between the solar panel 17 and the power capacitor 19 to ensure that the electrical current generated by the former runs in the correct direction to charge the latter. As seen in FIG. 5 at least two diodes 27 arranged in parallel to each other are preferred for this function because the electrical resistance therethrough is substantially reduced, by half with two diodes 27 in parallel, by two thirds with three diodes 27 in parallel, et cetera, as is readily demonstrated by application of Kirchoffs Law.

Similarly it is necessary that the voltage of the electrical current derived from the power capacitor 19 be regulated and voltage regulation 37 may be provided between the power capacitor 19 and the congruent electrical contacts 23.

Both of these additions to the basic circuit are depicted in FIG. 5 arbitrarily upon the top leg as the depiction of the test circuit, which is itself optional, is upon the lower leg. The test circuit, comprised of at least one diode 27 and an indicator 25, which as mentioned earlier is preferably a LED, further preferably possesses a switch 29 which, as seen in FIG. 4, is manually operated and is hence preferably accessible without removal of the cartridge 20. The indicator 25, also seen in FIG. 4, is preferably visible to the operator without removal of the cartridge 20. A power switch 29, similar to that shown on the test circuit, might be located on one of the legs between the power capacitor 19 and the congruent electrical contacts 23, requiring closure for operation and in the open position would assure that no current is lost from the power capacitor 19 when the electronic device is not in operation but this is considered redundant because a typical electronic device 10 uses current only when activated during operation. The only switch 29 seen in FIGS. 4 & 5 is hence optional and connects the optional test circuit including an indicator 25 to the main circuit including the power capacitor 19.

The indicator 25 visually indicates the state, i.e. the level of charge, of the power capacitor 19. Various states are recognized, namely, full charge, insufficient charge, and intermediate charge. The indicator 25 further preferably indicates a full charge with full brightness, insufficient charge with minimal brightness, and the range therebetween with a range of brightness in accordance with the charge held by the power capacitor 19. Alternatively, the indicator 25 may act in the reverse manner whereby insufficient charge is indicated by a noticeable brightness and sufficient charge is indicated by the lack of a noticeable brightness which operation also obviates the need for a switch 29 as current is only used by the indicator 25 to signal low charge. The intermediate state is not readily indicated with this alternative warning of low charge, however, as a complete reversal of the level of power detected is necessary, rather than a threshold, and without a switch 29 there would be a constant power drain. The use of a threshold which supplies current to the indicator 25 only in the condition of low power level minimizes the power drain and avoids the use of a test switch 29 but this alternative indicator 25 may drain the remaining charge and cease to operate as intended.

For this reason a test circuit with an indicator 25 which simply reflects the magnitude of the charge held by the power capacitor 19 and which is activated by closing a switch 29 is preferred as being inherently immune to this shortcoming as well as readily reflecting the intermediate levels of charge held by the power capacitor 19 with a relatively simple test circuit including a switch 29, at least one diode 27, and an indicator 25, as seen in FIG. 5. The two diodes 27 seen therein are further noted to be in series and a certain amount of resistance is also shown which both reflect the desirability of a relatively high resistance in the test circuit in comparison with the main circuit in order to minimize the current drawn by the former with respect to the latter.

Another optional feature represented in FIG. 5 is voltage regulation 37 which is included in most electronic devices 10 but may be desired in the associated circuitry contained in the cartridge 20. Voltage regulation 37 may be provided by a voltage reference which both fixes and stabilizes the input voltage while more sophisticated voltage regulation may additionally provide higher power safety protection which is normally absent from a simple voltage reference. Fixing and stabilizing input voltage with a voltage reference is considered more important though protection against excessive power input is also considered a useful addition in the voltage regulation 37 provided by a voltage reference.

Aside from the optional features of the circuit schematically represented by FIG. 5 which are discussed immediately above it is emphasized that the solar panel 17 is defined as a grouping of photovoltaic cells organized to function as one input source of D.C. electricity and that this input is in parallel to the power capacitor 19 which is parallel to the congruent electrical contacts 23 of which two are seen therein. As mentioned earlier at least one diode 27 within the circuit placing the solar panel 17 and the power capacitor 19 in parallel with each other is further necessary for ensuring that the input is correctly directed. It is preferred that at least two diodes 27 in parallel to each other be utilized as shown in FIG. 5 as discussed above and that this be provided in the associated circuitry within the cartridge 20 but that this means of assuring that the current input is in the proper direction may be located upon the solar panel 17 or along the external wiring 16 connecting the solar panel 17 to the cartridge 20 if the solar panel 17 is separate from the cartridge 20.

It is also noted that at least two congruent electrical contacts 23 are necessary but that a multiple of two, in accordance with the number of electrical contacts 13 present in the battery cavity 12 of the electronic devices 10 addressed, is encompassed. The electronic device 10 seen in FIG. 1 is intended to have two batteries and hence four electrical contacts 13 are present therein. If three or four batteries are intended for use in a similar manner and six or eight, respectively, electrical contacts 13 are present then six or eight congruent electrical contacts 23 are indicated. Batteries may also be placed in series with each other whereby two, three, or more batteries are aligned along the same axis and only two electrical contacts 13 are used for that group of batteries. A battery pack, as mentioned earlier, may be intended with use of a plug 36 connector intended to mate with a socket 35 typically comprising a recess in a wall of the battery cavity 12 in which case the two congruent electrical contacts 23 represented in FIG. 5 will comprise a plug 36 type electrical connector.

With regard to the characteristics of the solar panel 17 and the power capacitor 19 recommended for fulfillment of the principles relating to the present invention reference is made to U.S. Pat. No. 6,114,830 in the name of the present inventor for detailed discussion with regard to powering an infrared remote controller. This particular type of electronic device 10 is seen to be satisfactorily operated with four standard size photovoltaic panels each of one square centimeter collection area. The controller consumes 7 mA for one second of each operation at 2 V and, given 100 uses daily, 0.7 Coulomb is consumed. As the minimum operable voltage of this infrared controller is 2 V, with 4.4 Coulomb available and 0.7 Coulomb average usage per day, 6.3 days of usage is expected from a full charge. The suggested capacitance or rating for the power capacitor 19 in this case is 2 Faraday. Each standard, one square centimeter, photovoltaic panel produces 1.2 V and four utilized together as a solar panel 17 hence provides 4.8 V. The voltage drop across the pair of diodes 27 placed in parallel as seen in FIG. 5 is 0.6V and the voltage at the power capacitor 19 is 4.2V which is the maximum operable voltage for this particular electronic device 10.

It is recognized that an infrared controller is a type of electronic device 10 which consumes relatively little power for operation owing to several factors including manner of use which is intermittent and brief A radio or a portable telephone is expected to consume more power as is a PDA. Any electronic device 10 inclusive of an electric motor, such as a DVD or CD, player is expected to consume more power still. It is not considered necessary, however, to delve into the individual power requirements of various electronic devices beyond the observation that any electronic device 10 concerned herein is intended to be supplied with electrical power by batteries and hence the voltage and storage capacity of the batteries intended to be utilized provide the characteristics desired of the solar panel 17 and the power capacitor 19 recommended in replacement. While an infrared remote controller is a relatively modest consumer of power four square centimeters of collection surface for the solar panel 17 is also considered relatively modest.

Hence, depending upon the type of electronic device 10 addressed, utilization of the exposed surface 21 of the cartridge 20 when fitted into the battery cavity 12 of an electronic device 10, as seen in FIG. 3, for disposition of the solar panel 17 may readily be feasible and is certainly so in the case of an infrared remote controller. A 27" television infrared remote controller in possession of the present author, manufactured by Zenith™ and bearing U.S. Pat. Nos. 4,377,006 and 4,425,647 is powered by a single 1.5 V 'AA' dry cell battery and the battery cavity cover 11 for this electronic device 10 possesses a flat exterior surface area measuring 0.75"×2.75" (1.9×5.7 cm), i.e. 1.6875 in$^2$ or 10.83 cm$^2$, which is 2.7 times the area recommended for an appropriately sized solar panel 17.

An infrared remote controller for a television further requires relatively infrequent battery replacement which may essentially be equivalent to the life of the batteries involved while laptop style personal computers (PCs), which typically do not possess an individual battery cover 11 and are hence beyond the scope of the present invention, typically deplete a full charge in three hours of use. The battery utilized in a PC is further typically rechargeable, of highly specialized construction, and quite expensive in comparison with conventional dry cells, disposable or rechargeable. The range of electronic devices 10 encompassed by the present invention is hence understood to coincide with those which are intended to be powered by conventional batteries and are clearly defined by possession of a battery cavity cover 11 to a battery cavity 12 which possesses electrical contacts 13 which may be an opposed resilient type as depicted in FIG. 1 or the plug 36 and socket 35 type discussed previously in reference to typical portable telephones which are explicitly encompassed by the range of electronic devices 10 addressed herein. 9 Volt 'transistor' batteries, which were commonplace for powering radios some years ago, possess two electrical contacts on the same end, rather than being on opposed ends, and require a different type of electrical connector than the plug 36 and socket 35 type described as typical to modern portable telephones. This type of battery and any other which is intended to be disposed in a battery cavity 12 possessing an individual battery cavity cover 11 in an electronic device 10 are explicitly encompassed by the present invention.

Depending upon the power usage anticipated, which is considered to be indicated by the batteries intended for use in powering a particular electronic device 10, it may be appropriate to locate the solar panel 17 upon the exposed surface 21 of the cartridge 20 fitted into the battery cavity 12 as depicted in FIG. 3 or it may be desirable to utilize a solar panel 17 wholly separate from the cartridge 20 as depicted in FIG. 4 for several reasons including obtainment of a satisfactory collection surface area unrestricted by that available upon said exposed surface 21. While the surface area required to collect sufficient light to power a PC is considered impracticably large it has been shown that the surface area available upon the exposed surface 21 of a cartridge 20 intended to fit into the battery cavity 12 of a typical infrared controller is more than sufficient to the power that electronic device 10. These two examples are considered as extremes to the range of electronic devices 10 encompassed by the present invention and collection surface areas of a solar panel 17 in accordance with the principles relating to the present invention are hence measured in terms of an exposed surface area 21 of the cartridge 20, which is substantially equivalent to the surface area of the original battery cavity cover 11. The infrared controller discussed above has a battery cavity cover 11 with 10.83 square centimeters which is 2.7 times as large as the four square centimeters shown to be satisfactory for operation. If the electronic device 10 consumes power at five times the rate of an infrared remote controller a collection surface twice as large as the exposed surface 21 of the cartridge 20 is hence considered sufficient.

FIG. 6 depicts a cartridge 20 in accordance with the principles relating to the present invention with a solar panel 17 comprised of two sections 30 each possessing a collection area substantially equivalent to the area of the exposed surface 21 of the cartridge 20. One section 30 is seen to be separable laterally from the other section 30 in a substantially co-planar parallel arrangement obtained by sliding the same laterally outward which movement is facilitated by two opposed, parallel, tracks 31 which are slightly elevated with respect to, and which consume some of the exposed surface 21 area available for, the section 30 directly above the cartridge 20. The laterally separated section 30 is connected to the other, fixed, section 30 by external wiring 16 which preferably connect the two sections 30, 30 in series.

FIG. 7 depicts a cartridge 20 in accordance with the principles relating to the present invention with a solar panel 17 comprised of three sections 30 each possessing a collection area substantially equivalent to the area of the exposed surface 21 of the cartridge 20. Two sections 30 are seen to be extended laterally to either side of a third medial solar panel section 30 in substantially co-planar parallel arrangement effected by folding the two lateral sections 30 laterally outward which movement is facilitated by two hinges 32 one either side of the medial section 30 directly above the cartridge 20. One hinge 32 must be slightly elevated with respect to the other hinge 32 and one laterally extended section 30 consequently is slightly elevated with respect to the other laterally extended section 30 which is slightly elevated with respect to the medial section 30. The rotation outward of each lateral section 30 might simply be arrested by contact with the surface of the electronic device 10 adjacent the cartridge 20 or could be arrested by an elevation of the exposed surface 21 on either side of appropriate height. In either case the three sections 30 of the solar panel are left in substantially co-planar arrangement though slight differences in elevation and perhaps inclination are recognized which are considered to be negligible with regard to presentation of a substantially flat, continuous, solar panel 17.

The additional height of the two lateral sections 30 when folded flush one on top of the other on top of the medial section 30 directly above the cartridge 20 is considered of greater concern as the bottom of the electronic device 10 will not be smooth but the elevation required is considered modest. A standard photovoltaic cell is quite thin and a solar panel 17 requires less than ³⁄₃₂" (2.4 mm) thickness. The hinges 32 are hence considered to define the additional elevation required which, with a total of no more than ¼" (6 mm) from the exposed surface 21 of the cartridge or the medial section 30 in this case, is considered a relatively unobjectionable deviation from the dimensions of the original electronic device 10 with original battery cavity cover 11.

Figure 8:
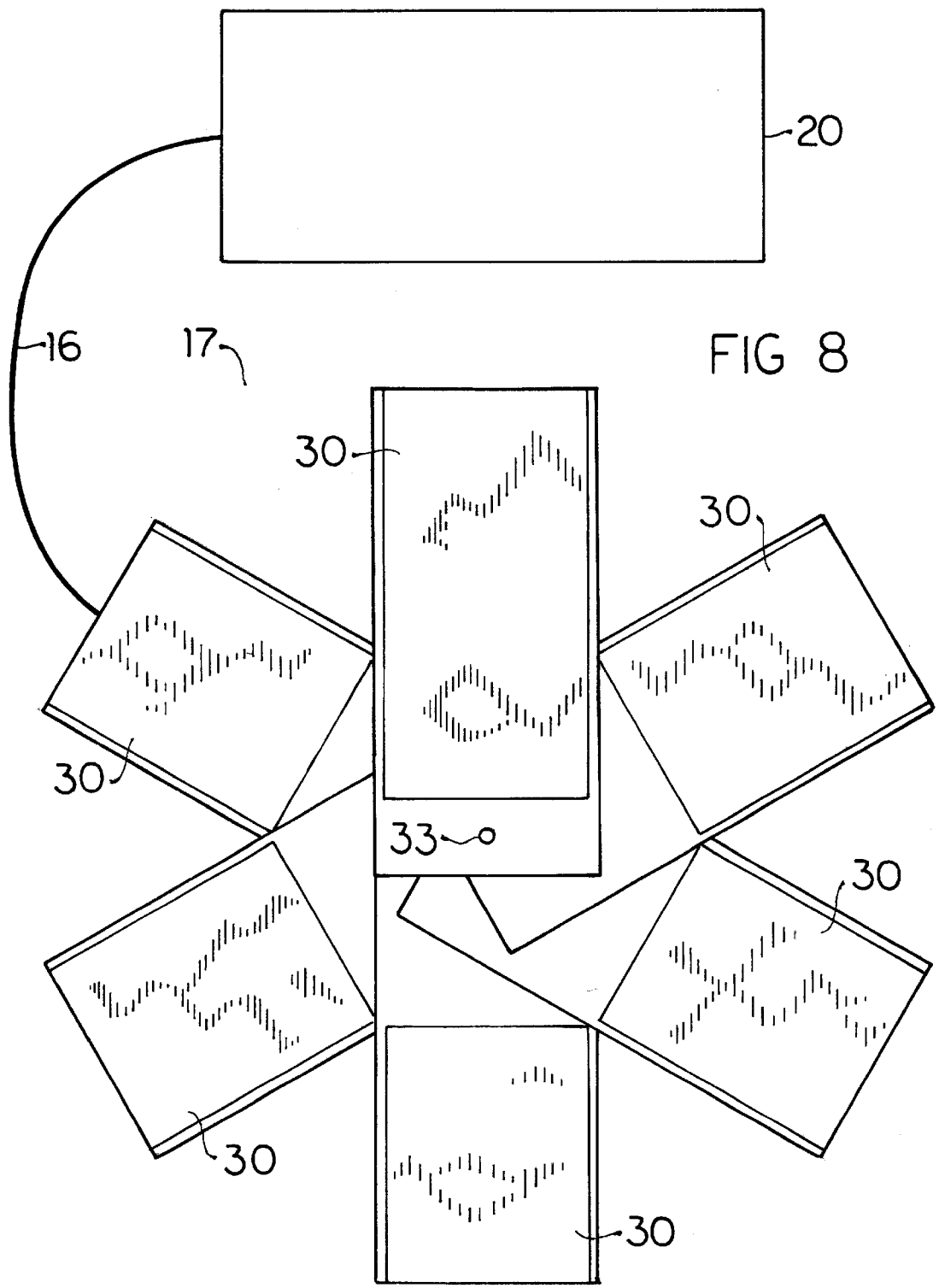
FIG. 8 is a plain elevational view of a preferred embodiment of the principles relating to the present invention including a solar panel comprised of six sections extensibly pivoted about a common axis and connected to the cartridge with wiring.

FIG. 8 depicts a solar panel 17 separate from the cartridge 20 comprised of six sections 30 which extend apart from each other about a single pivot 33. This solar panel 17 may be attachable to the exposed surface 21 of the cartridge by any suitable mechanical means such as a pair of opposed clips or may simply be provided as a separate unit. In separation from the cartridge 20 external wiring 16 is required and a plug 36 and socket 35 connection is suggested similar to the arrangement discussed above with regard to FIG. 4 wherein the cartridge preferably possesses a socket 35 and the external wiring 16 possesses a terminal plug 36. The connection of the external wiring 16 to the solar panel 17 is preferably fixed whether or not the solar panel 17 is attachable to the exposed surface 21 of the cartridge while a plug 36 and socket 35 or other of electrical connector may be utilized if desired much in accordance with the previous discussion of this aspect.

The foregoing is intended to provide one practiced in the art with the best manner of making and using an embodiment in accordance with the principles relating to the present invention and is not to be considered restrictive of the invention set forth thereby or the rights and privileges secured by Letters Patent in protection of the same and for which I claim:

1. A device intended to replace conventional batteries with photovoltaically generated electricity in powering an electronic device having a battery cavity possessing at least two interiorly disposed electrical contacts; said device comprising:

a cartridge containing a power capacitor of sufficient capacitance to hold an electric charge sufficient to power the electronic device, a solar panel located exteriorly to the cartridge, and associated circuitry electrically connecting said solar panel to said power capacitor including at least one diode;

said cartridge having at least two exterior congruent electrical contacts and being dimensioned to fit inside the battery cavity of said electronic device with said congruent electrical contacts in electrical contact with the electrical contacts inside said battery cavity;

said solar panel possessing photovoltaic cells capable of converting ambient light into direct current electricity and charging said power capacitor contained in said cartridge when fitted in said battery cavity and electrically connected to said electrical contacts through said associated circuit with at least one said diode assuring proper direction of current from said solar panel;

whereby the solar panel, being exteriorly located with respect to the cartridge, can provide the electronic device having said cartridge fitted in the battery cavity with a replacement power source derived from photovoltaic conversion of ambient light without removal of the cartridge from the electronic device and without interruption of the operational status of the electronic device.

* * * * *